United States Patent
Horner et al.

(10) Patent No.: US 8,864,559 B2
(45) Date of Patent: Oct. 21, 2014

(54) MULTIPLE OUTFLOW VALVE CABIN PRESSURE CONTROL SYSTEM

(75) Inventors: Darrell Horner, Oro Valley, AZ (US); Bob Olson, Tucson, AZ (US); Gerard McCoy, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1689 days.

(21) Appl. No.: 12/350,712

(22) Filed: Jan. 8, 2009

(65) Prior Publication Data

US 2010/0173575 A1    Jul. 8, 2010

(51) Int. Cl.
*B64D 13/00* (2006.01)
*B64D 13/04* (2006.01)

(52) U.S. Cl.
CPC ............... *B64D 13/04* (2013.01); *Y02T 50/545* (2013.01); *Y02T 50/56* (2013.01); *Y02T 50/54* (2013.01)
USPC .......................................................... 454/76

(58) Field of Classification Search
USPC ................ 454/69, 70, 71, 72, 73, 74, 76
See application file for complete search history.

(56) References Cited

U.S. PATENT DOCUMENTS

| | | | |
|---|---|---|---|
| 3,060,831 A * | 10/1962 | Fitz-Gerald | 454/73 |
| 3,544,045 A * | 12/1970 | Butscher | 244/129.1 |
| 5,520,578 A | 5/1996 | Bloch et al. | |
| 5,934,614 A | 8/1999 | Mueller et al. | |
| 6,979,257 B2 * | 12/2005 | Horner et al. | 454/74 |
| 2002/0193063 A1 | 12/2002 | Scheerer et al. | |
| 2006/0019594 A1 | 1/2006 | Horner et al. | |
| 2007/0102576 A1 | 5/2007 | McCoy et al. | |
| 2008/0233854 A1 | 9/2008 | Horner et al. | |

FOREIGN PATENT DOCUMENTS

WO    WO 2007054206 A1 *    5/2007

* cited by examiner

*Primary Examiner* — Steven B McAllister
*Assistant Examiner* — Brittany Towns
(74) *Attorney, Agent, or Firm* — Shimokaji & Associates P.C.

(57) ABSTRACT

A multiple outflow valve control system for an aircraft is provided having a plurality of outflow valves that may be controlled independently via an all electrical control system. The outflow valves may be located in various locations in an aircraft. The control system may have a control loop controlling the outflow valve motors via open-loop PWM commands and may not have a motor speed feedback in the control loop. The cabin pressure control system may have manual and auto controls controlling separate motors on each outflow valve. Auto motor control may be performed via software biasing command logic included in the control laws in the control system. Air flow may be biased through selected outflow valves and the degree of biasing may be automatically or manually set.

6 Claims, 4 Drawing Sheets

MULTIPLE OUTFLOW VALVE CABIN PRESSURE CONTROL SYSTEM

BACKGROUND OF THE INVENTION

The present invention relates generally to aircraft cabin pressure control systems, and more specifically to an all electric aircraft cabin pressure control system controlling a plurality of outflow valves providing for exhaust flow biasing.

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, the ambient pressure outside of the aircraft decreases and, unless otherwise controlled, excessive amounts of air could leak out of the aircraft cabin causing it to decompress to an undesirably low pressure. If the pressure in the aircraft cabin is too low, the aircraft passengers may suffer hypoxia, which is a deficiency of oxygen concentration in human tissue.

Studies have shown that the symptoms of hypoxia may become noticeable when cabin pressure altitude is above the equivalent of 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort and maintain cabin-to-atmosphere differential pressure below nominal and maximum limits. Thus, many cabin pressure control systems control cabin altitude as a function of aircraft altitude, and do so in a manner and rate that will keep the cabin-to-atmosphere differential pressure less than the nominal limit.

To maintain aircraft cabin altitude within a relatively comfortable range, cabin pressure control systems may be equipped with an outflow valve. An outflow valve may assist in controlling cabin pressure by regulating air flow out of the cabin. One particular type of outflow valve that may be used is a butterfly outflow valve. A butterfly outflow valve typically includes a flapper or gate, which is typically used as the control element to regulate the flow of air out of the cabin. More particularly, the flapper is coupled to a shaft that is rotationally mounted to the outflow valve body. An actuator, which is coupled to the shaft, positions the flapper element in response to commands from a controller to thereby regulate the air flow out of the cabin.

Conventional cabin pressure control systems are designed to exhaust cabin air during flight in order to comfortably and safely pressurize the fuselage (cabin) so that high altitude aircraft flight can occur. Cabin pressure control systems have used pneumatic, pneumatic-electric, and more recently all electric control systems. Typical CPCS designs have utilized a single electromechanically controlled outflow valve that is modulated to control the outflow of air from the cabin, thereby controlling cabin pressure. The electromechanically controlled outflow valve may be comprised of an embedded software controller that spins a motor which drives a geartrain connected to a butterfly valve.

As can be seen, there is a need for aircraft having more than a single outflow valve and an all electric cabin pressure control system for controlling multiple outflow valves.

SUMMARY OF THE INVENTION

According to one aspect of an embodiment of the present invention, a control unit for controlling aircraft cabin pressurization rate is provided. The control unit has a rate command circuit operable to supply cabin pressure rate-of-change commands. A rate limiter is coupled to receive the cabin pressure rate-of-change commands and operable, in response thereto, to limit the cabin pressure rate-of-change commands to prevent the cabin pressurization rate from exceeding the cabin pressurization rate limit. A comparator is configured to receive the rate-of-change command from the rate limiter and sensed cabin pressure rate-of-change values and operable, in response thereto, to supply unbiased duty cycle command values representative of a difference between the rate-of-change command from the rate limiter and the sensed cabin pressure rate-of-change values. An outflow valve biasing control is configured to receive the unbiased duty cycle command values, a value representative of the angle of a first outflow valve, a value representative of the angle of a second outflow valve, and a commanded flow ratio between the first and second outflow valves. The outflow valve biasing control is configured to provide a first biased duty cycle command to a motor of the first outflow valve and a second biased duty cycle command to a motor of the second outflow valve. The first biased duty cycle command supplied to a motor of the first outflow valve is based on a difference between a duty cycle bias offset and the unbiased duty cycle command values. The second duty cycle command supplied to a motor of the second outflow valve is based on a sum of the duty cycle bias offset and the unbiased duty cycle command.

In another aspect of an embodiment of the present invention a multiple outflow valve cabin pressure control system for an aircraft is provided. The control system has a first outflow valve unit with a first valve, a first automatically controlled motor configured to open and close the first valve, a first manually controlled motor configured to open and close the first valve, a first automatic controller having inputs from avionics of the aircraft and being configured to automatically control the first automatically controlled motor, a first manual controller having a pilot interface and being configured to manually control the first manually controlled motor, and a first rotary position sensor configured to sense the position of the first valve and supply a position sensor feedback to the first automatic controller. The control system also has a second outflow valve unit with a second valve, a second automatically controlled motor configured to open and close the second valve, a second manually controlled motor configured to open and close the second valve, a second automatic controller having inputs from avionics of the aircraft and being configured to automatically control the second automatically controlled motor, a second manual controller having a pilot interface and being configured to manually control the second manually controlled motor, and a second rotary position sensor configured to sense the position of the second valve and supply a position sensor feedback to the second automatic controller. A cross-com link is configured to supply the position of the first valve to the second automatic controller and to supply the position of the second valve to the first automatic controller. The first and second automatic controllers are configured to automatically control the first and second valves to bias air flow within the cabin in response to a commanded flow ratio.

In yet another aspect of an embodiment of the present invention, an aircraft cabin pressure control system is provided. The control system has a cabin pressure command circuit with a cabin pressure sensor configured to sense aircraft cabin pressure and supply a cabin rate error signal. An outflow valve control unit is configured to receive the cabin rate error signal, the angle of a first outflow valve, the angle of a second outflow valve, and a commanded flow ratio between the first and second outflow valves and operable, in response thereto, to supply a first duty cycle command to the first outflow valve and a second duty cycle command to the second outflow valve. The outflow control unit has a first comparator configured to receive an actual outflow valve flow ratio between the first and second outflow valves and the commanded flow ratio between the first and second outflow valves and to supply the difference of the actual outflow valve flow ratio and the commanded flow ratio to controls configured to provide a duty cycle bias offset. A second comparator is configured to receive the duty cycle bias offset and the unbiased duty cycle command signal and to supply a duty cycle command to the first outflow valve by taking the difference between the duty cycle bias offset and the unbiased duty cycle command signal. A third comparator is configured to receive the duty cycle bias offset and the unbiased duty cycle command signal and to supply a duty cycle command to the second outflow valve by adding the duty cycle bias offset and the unbiased duty cycle command signal together.

These and other features, aspects of embodiments of the present invention will become better understood with reference to the following drawings, description and claims.

DETAILED DESCRIPTION OF THE INVENTION

Figure 1:
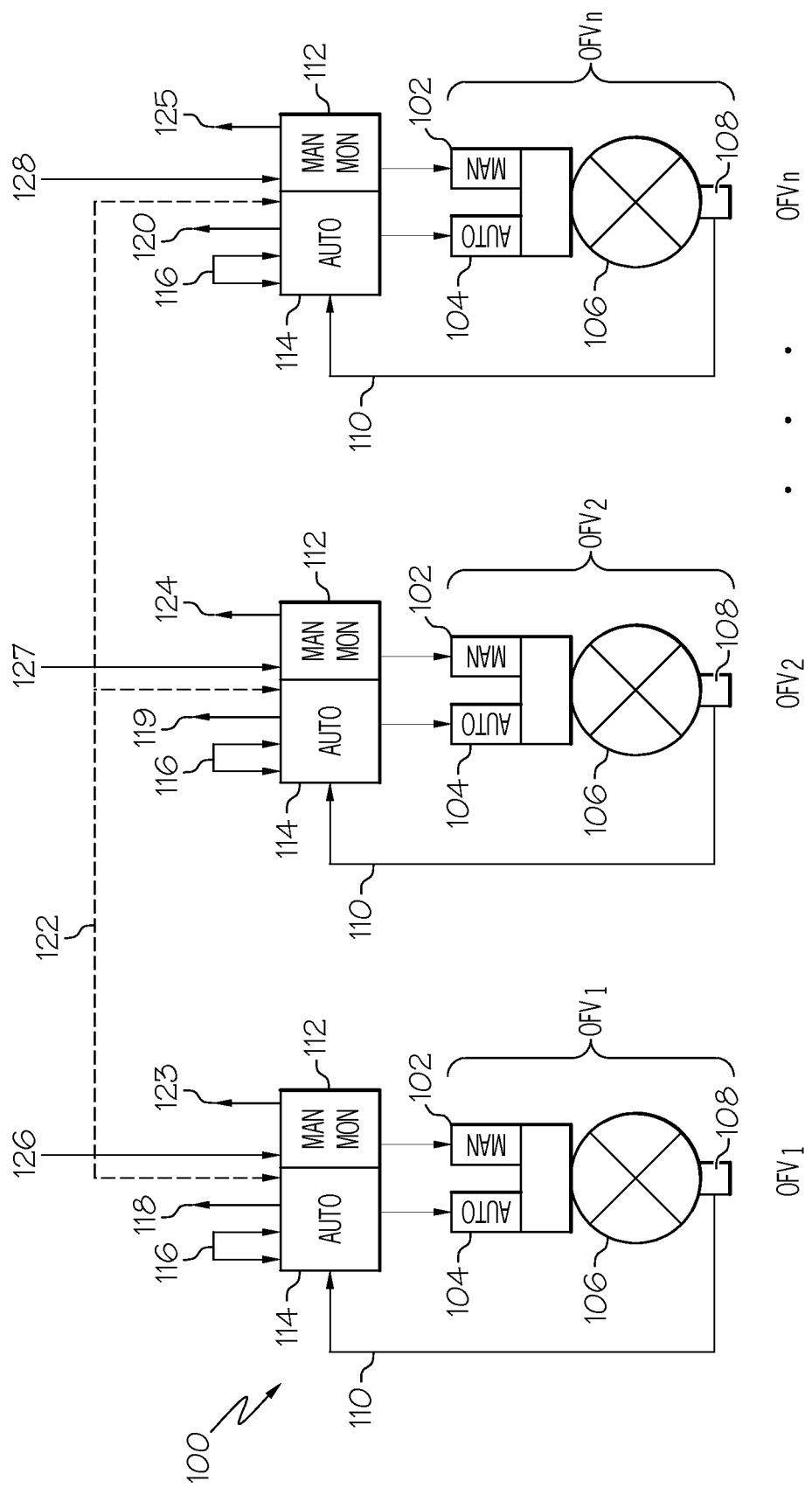
FIG. 1 is a functional block diagram of an aircraft cabin pressure control system having a multiple out flow valve (OFV) system according to an embodiment of the present invention.

The following detailed description is of the best currently contemplated modes of carrying out embodiments of the invention. The description is not to be taken in a limiting sense, but is made merely for the purpose of illustrating the general principles of embodiments of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

A multiple outflow valve control system of embodiments of the present invention may provide an aircraft with multiple small OFVs that may be controlled independently via an all electrical control system. The OFVs may be located in various locations in an aircraft. This configuration may allow for higher system dispatch reliability and availability as well as more possible ventilation functions with flow biasing. A plurality of smaller OFVs in place of a single larger OFV may make decompression less likely in the event of a malfunction since the exhaust flow through area in a single smaller OFV is lower. Additionally, a plurality of smaller OFVs may cause less acoustic noise than a single OFV. Further, having a plurality of OFVs electronically controlled with single auto channel controllers may provide for a lower cost for electronics and OFV actuators. Another advantage that may be realized in the event an OFV is erroneously closed wherein the other OFVs may be sized to compensate for the lack of air flow through the closed OFV. This configuration may place less reliance on a pressure relief valve.

Aspects of embodiments of the present invention provide multiple OFV, i.e., 2 (or more) smaller all-electric butterfly OFVs, and a CPCS having a single auto channel for controlling the OFVs. Each OFV may have a single auto channel controller associated with its auto motor. The control loop may control the OFV motors via open-loop PWM commands and may not have a motor speed feedback in the control loop. The CPCS may have manual and auto controls controlling separate motors on each OFV. Auto motor control may be performed via software biasing command logic included in the control laws. Provision may be made for computation and transportation delays between a master and slave controllers/motors. Manual controllers may control the OFV's manual motor. A single auto channel and manual control function may be combined in a single chassis to allow monitoring as well.

OFVs may be located throughout the aircraft, on cabin-to-ambient pressure bulkheads, to provide ventilation functions wherever required. The OFVs may have valve position feedback to the auto controller and may not have valve position feedback to the manual controller. Cross communication may be made between all of the controllers. Cross communication may enable special software programmed control functions to independently control each OFV to safely and comfortably control cabin pressure. Cross communication may also allow for control of OFV positions for flow biasing, smoke removal, avionics cooling, exhaust of fuel vapors, and exhaust of lavatory odors, for example.

Manual and monitoring control may be powered by a battery backup power bus. Auto control between two valves may have separated power sources (e.g. 28VDC1 for OFV1 and 28VDC2 for OFV2). If more than 2 OFVs are used, then each additional OFV's auto controller may be powered by 28VDC1 or 28VDC2 or another available bus as is known in the art.

An independent altitude limit monitor may be used for each OFV to prevent a common failure from opening all OFVs at the same time or erroneously closing all OFVs at the same time. All necessary airplane inputs may be received by each auto controller. This may enable auto control redundancy in the event of a CPCS auto channel failure on any given OFV.

The OFVs may be sized such that any one OFV can be failed closed and the aircraft may still safely land with low enough differential pressure to be within the structural limit and allow the airplane doors to be safely opened. The OFVs may be sized such that when all are opened, they provide just enough outflow effective area to meet the specified ground differential pressure requirement.

The CPCS may also have one positive pressure relief valve (PPRV) and one negative pressure relief valve (NPRV) that are independent in control and function of the OFVs, such that a common failure of the OFV system would not preclude over and under pressure protection. The PPRV and NPRV functions may be combined in one valve.

The multiple outflow valve control system of an aspect of embodiments of the present invention provides an aircraft with multiple small OFVs that may be controlled independently. The OFVs may be located in various locations in an aircraft. This may allow higher system dispatch reliability (availability) and more possibilities to provide ventilation functions. A plurality of smaller OFVs may make decompression less critical since the exhaust area of an individual valve may be smaller than that in a conventional single OFV system. More than one OFV may share the airflow, therefore, less airflow may be flowing through smaller OFVs which may produce less noise. The plurality of OFVs may be controlled with single auto channel controllers which may result in lower cost for electronics and OFV actuators. Additionally, if an OFV is erroneously closed for some reason, the other OFVs may be sized to compensate for this. Therefore, a pressure relief valve may not serve as critical of a function as in a single OFV system.

Referring now to FIG. 1, there is shown architecture for a multiple OFV system. CPCS 100 may have at least two outflow valves, $OFV_1$ and $OFV_2$. CPCS 100 may have three or more outflow valves, $OFV_n$, each placed in a desired pressure control location in the aircraft. Each $OFV_1$ through $OFV_n$ may be placed within the bulkhead of the aircraft and may be in flow communication with the cabin air and outside ambient atmosphere. Any OFV as is known in the art, such as a butterfly OFV, may be used with CPCS 100.

Each $OFV_1$ through $OFV_n$ may be an assembly having an auto controlled motor 104 and a separate manually controlled motor 102. Each motor 102 and 104 may be suitable for opening and closing flap 106 within $OFV_1$ through $OFV_n$. Each $OFV_1$ through $OFV_n$ may have a rotary position sensor 108 which senses the position of flap 106. Each rotary position sensor 108 may be electrically connected to an auto controller 114 via a position sensor feedback 110. Auto controller 114 may control an auto controlled motor 104 and may have inputs 116 from the avionics of the aircraft. Each controller may have an individual power supply 118, 119, and 120. Each manually controlled motor 102 may be controlled with a manual controller 112. Each manual controller may have a separate pilot interface 126, 127, and 128 and a separate power battery backup 123, 124, and 125. A cross-com link 122 may link each set of controllers 114 of each $OFV_1$ through $OFV_n$.

Figure 2:
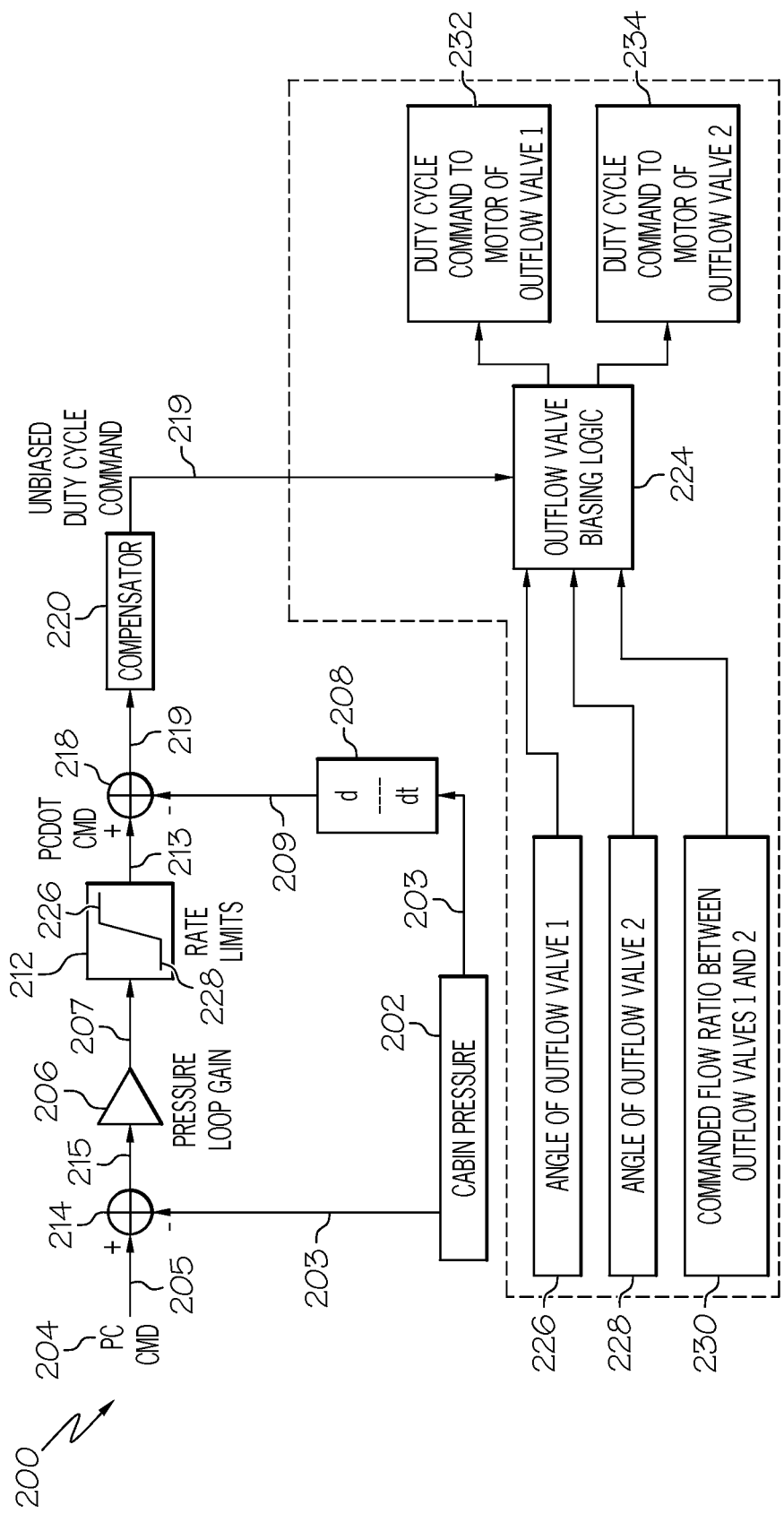
FIG. 2 is a functional block diagram of a control circuit that may be included in the system of FIG. 1.

Turning now to FIG. 2, a more detailed description of a portion of outflow valve control circuit 200 is provided. As FIG. 2 illustrates, outflow valve control circuit 200 may include a cabin pressure sensor 202, a cabin pressure command circuit 204, a rate command circuit 206, a rate circuit 208, and a rate limiter 212. Cabin pressure sensor 202 may have a pressure signal conditioning circuit, as are known in the art, therewith for receiving the pressure signals supplied by the cabin pressure sensor 202 and supplying a sensed cabin pressure signal 203 to a first comparator 214 and to the rate circuit 208. The cabin pressure command circuit 204 may be coupled to receive one or more signals supplied from the avionics, signals supplied from one or more sensors, or signals supplied from auto or manual controls. The signals from the avionics and one or more of the sensor signals may be representative of the operational mode of the aircraft. In response to the received signals, the cabin pressure command circuit 204 may determine the aircraft operational mode and, based on the determined operational mode, additionally may determine a target cabin pressure. The cabin pressure command circuit 204 in turn may supply a cabin pressure command signal 205, representative of the determined target cabin pressure, to the first comparator 214. It will be appreciated that the cabin pressure command circuit 204 may also be implemented using any one of numerous circuit topologies and may include any one of numerous types of circuits for determining the target cabin pressure and supplying the pressure command signal 205. For example, the cabin pressure command circuit 204 may be implemented using one or more analog circuits or one or more digital circuits. Preferably, the cabin pressure command circuit 204 is implemented digitally.

The first comparator 214 may receive both the sensed cabin pressure signal 203 from the cabin pressure sensor 202 and the cabin pressure command signal 205 from the cabin pressure command circuit 204. In response to these signals 203, 205, the first comparator 214 may supply a cabin pressure error signal 215 that is representative of a difference between the sensed (or actual) cabin pressure 203 and the commanded cabin pressure 205. The cabin pressure error signal 215 may in turn be supplied to the cabin rate command circuit 206, which may generate a cabin pressure rate-of-change command signal 207 and supply the cabin pressure rate-of-change command signal to the rate limiter 212.

Pressure sensor 202 may additionally supply the sensed cabin pressure signal 203 to the rate circuit 208. The rate circuit 208, upon receipt of the sensed cabin pressure signal 203, may determine the sensed cabin pressure rate-of-change and supply a sensed (or actual) cabin pressure rate-of-change signal 209 representative thereof to a second comparator 218. The rate circuit 208 may be implemented using any one of numerous circuit topologies and may include any one of numerous types of circuits for determining the cabin pressure rate-of-change. For example, the rate circuit 208 may be implemented using one or more analog filter circuits or one or more digital filter circuits. Preferably, the rate circuit 208 determines the cabin pressure rate-of-change by implementing a digital filter circuit.

The rate limiter 212 may prevent the cabin pressurization rate from exceeding an ascent rate limit 226 and a descent rate limit 228. To do so, the rate limiter 212 may limit the cabin pressure rate-of-change command signal 207 supplied from the rate command circuit 206 to values between the ascent rate limit 226 and the descent rate limit 228. More specifically, the rate limiter 212 may not limit the cabin pressure rate-of-change command signal 207 if the cabin pressure rate-of-change command signal 207 is between the ascent rate limit 226 and the descent rate limit 228. If, however, the cabin pressure rate-of-change command signal 207 is not between the ascent rate limit 226 and the descent rate limit 228, then the rate limiter 212 may set the cabin pressure rate-of-change command signal 207 equal to the specific rate limit 226, 228 that is being exceeded.

The second comparator 218 may receive the cabin pressure rate-of-change command signal 213 supplied from the rate limiter 212 and the sensed cabin pressure rate-of-change signal 209 supplied from the rate circuit 208. In response, the second comparator 218, may supply a cabin rate error signal 219, representative of a difference between the commanded cabin pressure rate-of-change and the sensed (actual) cabin pressure rate-of-change, to outflow valve biasing logic 224. Cabin rate error signal 219 may be an unbiased duty cycle command. Optionally, the cabin rate error signal or unbiased duty cycle command 219 may be first supplied to compensator 220 wherein compensator 220 then supplies a compensated unbiased duty cycle command to outflow valve biasing logic 224.

The angle of a valve element controlling the flow of air through $OFV_1$, 226, and the angle of a valve element controlling the flow of air through $OFV_2$, 228, may also be supplied to outflow valve biasing logic 224. An outflow ratio biasing command 230 between outflow valves 1 and 2 may be supplied to outflow valve biasing logic 224 as well. Outflow valve biasing logic 224 may then compute and electronically provide biased duty cycle command 232 to a motor controlling $OFV_1$ and a biased duty cycle command 234 to a motor controlling $OFV_2$.

Figure 3:
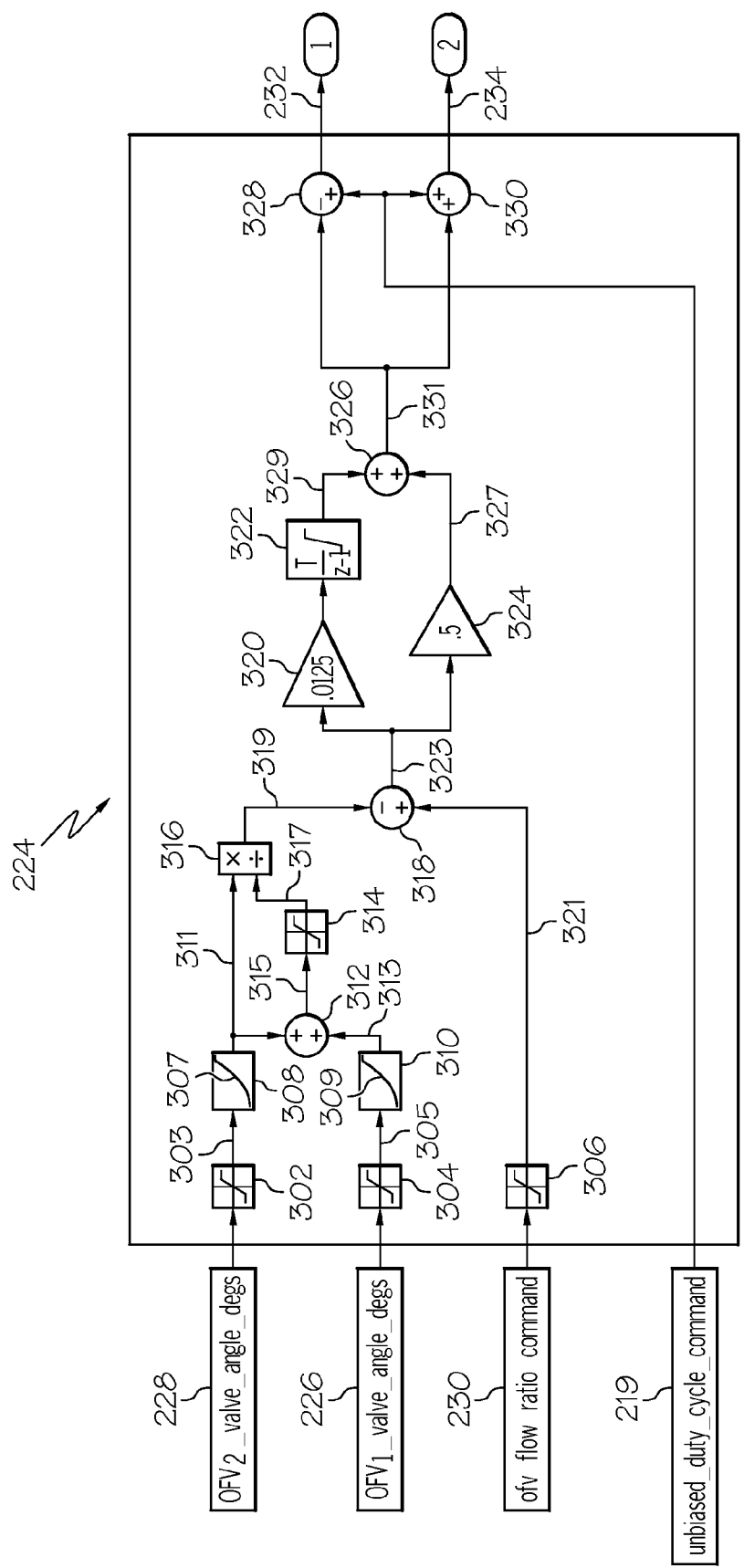
FIG. 3 is a functional block diagram outflow biasing control according to an embodiment of the present invention.

FIG. 3 schematically shows the logic flow of outflow biasing logic 224. Unbiased duty cycle command 219, $OFV_2$ angle 228, OFV$_1$ angle 226, and outflow ratio biasing command 230 may each be supplied to outflow biasing logic 224. Outflow ratio biasing command 230 may be provided manually or automatically and may have a value between 0 and 1. Outflow biasing ratio command may represent the percentage of total air flow through OFV$_1$ and OFV$_2$ to be directed through each individual valve OFV$_1$ and OFV$_2$. For example, an outflow ratio biasing command 230 value of 0 may completely close OFV$_1$ or OFV$_2$ and provide full flow to the other of OFV$_1$ or OFV$_2$. An outflow ratio biasing command 230 value of 0.2 may provide 20% of the total flow through OFV$_2$ and provide 80% of the total flow through OFV$_1$. Any commanded flow ratio between the first and second outflow valves in a range of 0-0.499 or in a range of 0.501 and 1.0 may bias the airflow between the valves.

OFV$_2$ angle 228 may be supplied to saturation block 302 providing a valve angle value 303, between 0° and 90°, which may be supplied to block 308. Block 308 may compare the supplied valve angle value 303 to an effective flow area vs. valve angle curve 307 to provide an effective flow area 311 of OFV$_2$.

OFV$_1$ angle 226 may be supplied to saturation block 304 providing a valve angle value 305, between 0° and 90°, which may be supplied to block 310. Block 310 may compare the supplied valve angle value 305 to an effective flow area vs. valve angle curve 309 to provide an effective flow area 313 of OFV$_1$.

Effective flow area 311 of OFV$_2$ and effective flow area 313 of OFV$_1$ may be added at comparator 312 to provide a total effective flow area 315 which is provided to block 314. Block 314 may provide a saturation value 317 between 0.0001 and infinity to block 316. Effective flow area 311 of OFV$_2$ may also be provided to block 316 from block 308. Block 316 may calculate an actual outflow valve flow ratio between OFV$_1$ and OFV$_2$, 319, having a value between 0 and 1, and provide it to comparator 318.

Outflow ratio biasing command 230 may be supplied to block 306. Block 306 may provide a saturation value, 321, between 0 and 1 to comparator 318. Comparator 318 may calculate the difference between saturation value 321 and outflow valve flow ratio 319 to provide outflow valve ratio error 323. Outflow valve ratio error 323 may be provided to biasing proportional gain 324 which may supply duty cycle bias offset proportional 327. Outflow valve ratio error 323 may also be provided to biasing integral gain 320 which may provide an integral gain to discrete-time integrator 322. Discrete-time integrator 322 may provide duty cycle bias offset integral 329 to comparator 326. Duty cycle bias offset proportional 327 may also be provided to comparator 326. Comparator 326 may add duty cycle bias offset proportional 327 with duty cycle bias offset integral 329 to provide duty cycle bias offset 331, having a value between −1 and 1, to comparators 328 and 330.

Comparator 328 may calculate the difference between unbiased duty cycle command 219 and duty cycle bias offset 331 to provide OFV$_1$ duty cycle command 232 to a motor, 104, of OFV$_1$. Comparator 330 may calculate the sum of unbiased duty cycle command 219 and duty cycle bias offset 331 to provide OFV$_2$ duty cycle command 234 to a motor, 104, of OFV$_2$.

It is to be understood that outflow biasing logic 224 may be adapted to provide a duty cycle command to more valves than two, e.g. outflow biasing logic 224 may be adapted to provide a duty cycle command to OFV$_n$, such as the multiple OFV system 100 shown in FIG. 1.

Figure 4:
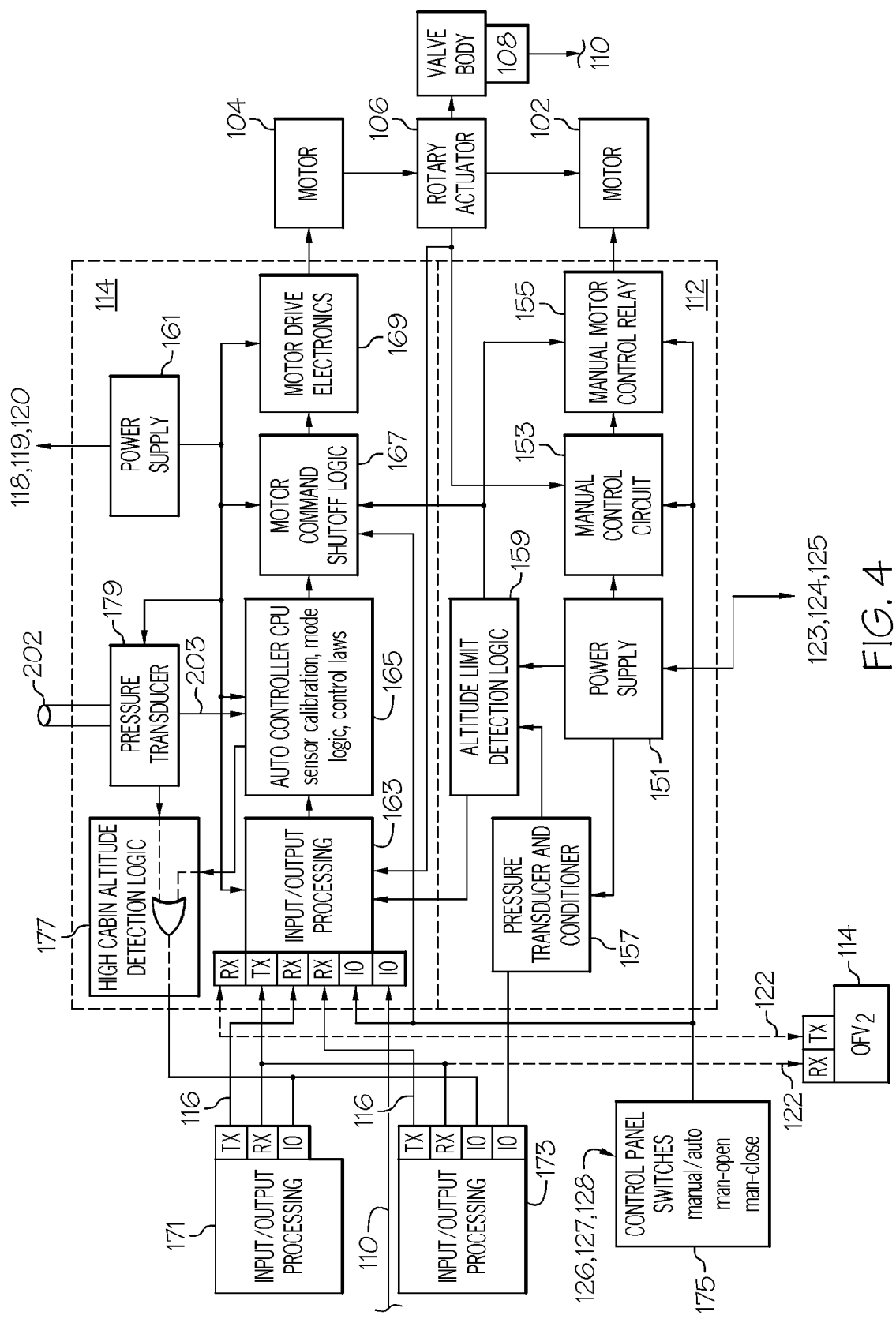
FIG. 4 is a functional block diagram of a portion of the air craft cabin pressure control of FIG. 1 showing the logic of the auto and manual controllers.

FIG. 4 shows detailed logic that may be used to control motors 102 and 104 of any or all of outflow valves OFV$_1$ through OFV$_n$ in CPCS 100. An example of auto controller 114 is depicted in the upper block and an example of manual controller 112 is depicted in the lower block. As shown, there is a power supply 151 for power sources 123, 124, 125. Control panel 175 may have switches used for pilot interfaces 126, 127, and 128. Pilot interfaces 126, 127, 128 may disable the auto control partition 114 by the input/output processing 163 to auto controller CPU 165 path and may also be accomplished with the motor command shutoff logic circuit 167.

The pilot interfaces 126, 127, and 128 may also enable manual control by energizing the manual control circuit 153. In addition, the pilot interfaces 126, 127, and 128 may control the manual control circuit 153 and the manual motor control relay 155 to operate manual motor 102 in the open or closed valve direction. Additionally, the manual/monitor partition 112 of cabin pressure controller 100 may contain a pressure transducer and conditioner circuit 157. Cabin pressure transducer and conditioner circuit 157 may be used to output an analog signal representing the true cabin pressure to the integrated avionics computer having channel 1, 171, and channel 2, 173. Pressure transducer and conditioner circuit 157 may also be read by the altitude limit detection logic 159 to determine if the cabin pressure is lower than a specified threshold (example: 15,000 ft equivalent cabin pressure). If altitude limit detection logic 159 detects that the cabin altitude exceeds the threshold value (e.g. cabin pressure less than the threshold value), then this signal may be read by the auto control channel's input/output processing logic 163 and ultimately auto controller CPU 165. In parallel, the auto motor command shutoff logic 167 may use this signal to disable control of auto motor 104 with motor drive electronics 169. Likewise, this signal may be used by the manual motor control relay 155 to command the manual motor 102 in the closed direction.

As shown in auto controller 114, there is a power supply 161 for power sources 118, 119, 120. This power supply is independent from power supply 151 and power sources 123, 124, and 125. Auto controller may have pressure transducer circuit 179 to sense actual cabin pressure 202 and create sensed cabin pressure signal 203 for use by the CPU 165.

Auto controller 114 may also contain an input/output processing circuit 163 to process cross-controller communication 122 from OFV2 for use by the CPU 165. The input/output circuit 163 may also be used to transmit cross-controller communication 122 to OFV2 for use by its auto controller 114. The input/output processing circuit 163 may also be used to receive airplane inputs 116 for use by the CPU 165. The input/output processing circuit 163 may also be used to receive valve position feedback 110 from the valve rotary position sensor 108.

Auto controller CPU 165 may perform logic of one or more of cabin pressure command circuit 204, cabin pressure command signal 205, cabin rate command circuit 206, cabin pressure rate-of-change command signal 207, rate circuit 208, sensed (or actual) cabin pressure rate-of-change signal 209, cabin pressure rate-of-change command signal to the rate limiter 212, cabin pressure rate-of-change command signal 213, first comparator 214, cabin pressure error signal 215, second comparator 218, cabin rate error signal 219, compensator 220, outflow valve biasing logic 224, OFV$_1$ angle 226, OFV$_2$ angle 228, outflow ratio biasing command 230, biased duty cycle command 232, and biased duty cycle command 234. Each of these logics are shown in FIGS. 2 and 3. It should be understood, of course, that the foregoing relates to exemplary embodiments of the invention and that modifications may be made without departing from the spirit and scope of the invention as set forth in the following claims.

We claim:

1. A multiple outflow valve cabin pressure control system for an aircraft comprising:
   a first outflow valve unit comprising:
      a first valve;
      a first automatically controlled motor configured to selectively open and close said first valve to produce a first flow rate through said first valve;
      a first manually controlled motor configured to selectively open and close said first valve to produce the first flow rate through said first valve;
      a first automatic controller having inputs from avionics of said aircraft and being configured to automatically control said first automatically controlled motor without the aid of motor or valve speed feedback;
      a first manual controller having a pilot interface and being configured to manually control said first manually controlled motor; and
      a first rotary position sensor configured to sense angular position of said first valve and supply an angular position sensor feedback of the first valve to said first automatic controller;
   a second outflow valve unit comprising:
      a second valve;
      a second automatically controlled motor configured to selectively open and close said second valve to produce a second flow rate through said second valve, said second flow rate having a commanded flow rate ratio relative to the first flow rate;
      a second manually controlled motor configured to selectively open and close said second valve to produce the second flow rate through said second valve, said second flow rate having the commanded flow rate ratio relative to the first flow rate;
      a second automatic controller having inputs from avionics of said aircraft and being configured to automatically control said second automatically controlled motor without the aid of motor or valve speed feedback;
      a second manual controller having a pilot interface and being configured to manually control said second manually controlled motor; and
      a second rotary position sensor configured to sense angular position of said second valve and supply an angular position sensor feedback of the second valve to said second automatic controller;
   a cross-com link configured to supply the position of said first valve to said second automatic controller and to supply the position of said second valve to said first automatic controller;
   an outflow valve biasing control configured to receive a value representative of the angular position of the first valve, a value representative of the angular position of the second valve, and a commanded flow ratio between the first and second valves; and
   said first and second automatic controllers being configured to receive duty cycle commands from the outflow biasing control and automatically control said first and second valves to bias air flow within said cabin in response to the commanded flow ratio between the first and second valves.

2. The multiple outflow valve cabin pressure control system of claim 1 further comprising a third outflow unit;
   said third valve unit comprising:
      a third valve;
      a third automatically controlled motor configured to selectively open and close said third valve to produce a third flow rate through said third valve, said third flow rate having a commanded flow rate ratio relative to the first flow rate and the second flow rate;
      a third manually controlled motor configured to selectively open and close said third valve to produce a third flow rate through said third valve, said third flow rate having a commanded flow rate ratio relative to the first flow rate and the second flow rate;
      a third automatic controller having inputs from avionics of said aircraft and being configured to automatically control said third automatically controlled motor without the aid of motor or valve speed feedback;
      a third manual controller having a pilot interface and being configured to manually control said third manually controlled motor; and
      a third rotary position sensor configured to sense angular position of said third valve and supply an angular position sensor feedback to said third automatic controller;
   said cross-com link configured to supply the angular position of said first valve to said second and third automatic controllers, the angular position of said second valve to said first and third automatic controllers, the angular position of said third valve to said first and second automatic controllers;
   the outflow valve biasing control configured to receive a value representative of the angular position of the third valve and a commanded flow ratio between the first, second and third valves and
   said first, second, and third automatic controllers being configured to receive the duty cycle commands from the outflow biasing control and automatically control said first, second, and third valves to bias air flow within said cabin in response to the commanded flow ratio between the first, second and third valves.

3. The multiple outflow valve cabin pressure control system of claim 1 wherein:
   the outflow valve biasing control is configured to receive unbiased duty cycle command values;
   the outflow valve biasing control is configured to provide a first biased duty cycle command to the first valve and a second biased duty cycle command to the second valve;
   the first biased duty cycle command to the first valve being based on a difference between a duty cycle bias offset and the unbiased duty cycle command values; and
   the second duty cycle command to the second valve being based on a sum of the duty cycle bias offset and the unbiased duty cycle command.

4. The multiple outflow valve cabin pressure control system of claim 1 wherein the commanded flow ratio between the first and second valves is in a range of 0 and 0.499 or in a range of 0.501 and 1.0.

5. The multiple outflow valve cabin pressure control system of claim 1 wherein the first and second valves are placed within a cabin of an aircraft at separate locations spaced to provide a desired direction of airflow within a portion of the cabin.

6. The multiple outflow valve cabin pressure control system of claim 1 being an all electrical-mechanical system.

* * * * *